United States Patent
Kulkarni

(10) Patent No.: US 12,389,072 B2
(45) Date of Patent: Aug. 12, 2025

(54) MACHINE LEARNING BASED PERFORMANCE TUNING OF STREAMING DEVICES

(71) Applicant: DISH Network L.L.C., Englewood, CO (US)

(72) Inventor: Aditya Kulkarni, San Jose, CA (US)

(73) Assignee: DISH Network L.L.C., Englewood, CO (US)

( * ) Notice: Subject to any disclaimer, the term of this patent is extended or adjusted under 35 U.S.C. 154(b) by 0 days.

(21) Appl. No.: 18/500,340

(22) Filed: Nov. 2, 2023

(65) Prior Publication Data

US 2025/0150675 A1 May 8, 2025

(51) Int. Cl.
*H04N 21/466* (2011.01)
*H04N 21/81* (2011.01)

(52) U.S. Cl.
CPC ..... *H04N 21/4668* (2013.01); *H04N 21/8173* (2013.01)

(58) Field of Classification Search
CPC .................. H04N 21/4668; H04N 21/8173
See application file for complete search history.

(56) References Cited

U.S. PATENT DOCUMENTS

| 9,760,399 B1 * | 9/2017 | Fraser | G06F 9/485 |
| 2019/0179662 A1 * | 6/2019 | Chen | G06F 12/023 |

FOREIGN PATENT DOCUMENTS

EP 1473906 A2 * 11/2004 ............. H04L 29/06

* cited by examiner

*Primary Examiner* — Sumaiya A Chowdhury

(57) ABSTRACT

Described herein are systems, methods, and media for managing streaming devices using machine learning models. In an embodiment, a method of managing streaming devices includes detecting that a streaming application is launched on a streaming device; recommending a set of software components for the streaming device, wherein the set of recommended software components includes the streaming application; determining a set of software components that are actually running on the streaming device; and closing at least one of the software components that are actually running but not in the set of recommended software components.

20 Claims, 7 Drawing Sheets

MACHINE LEARNING BASED PERFORMANCE TUNING OF STREAMING DEVICES

TECHNICAL FIELD

The present disclosure relates generally to streaming devices, more particularly, to optimizing performance by dynamically disabling software components on streaming devices based on machine learning techniques.

BRIEF SUMMARY

Today's streaming devices typically offer functionalities beyond content streaming. In many cases, video streaming is a secondary functionality on some streaming devices. For example, people often use smart phones as a streaming device. The complexity of the software and the number of applications running simultaneously on such devices can often lead to performance degradation due to resource contention. As a result, users often encounter delays, diminished video clarity, extended buffering durations, or even system failures when there's an overload of concurrent applications or functions.

Managing these applications efficiently to maintain optimal device performance can be a challenge for many users. Users often open multiple applications and forget to close them. Additionally, not every user is technically knowledgeable. Some users do not know which applications are resource-heavy and are slowing down the device, while others aren't sure how to manage or close applications. Given the large number of applications available on these devices, deciding which ones to turn off for better performance becomes a daunting task.

Described herein are systems, methods, and media for managing streaming devices using machine learning models. In an embodiment, a method of managing streaming devices, including: detecting that a streaming application is launched on a streaming device; recommending a set of software components for the streaming device, wherein the set of recommended software components includes the streaming application; determining a set of software components that are actually running on the streaming device; and closing at least one of the software components that are actually running but not in the set of recommended software components.

In some embodiments of the method, the set of recommended software components for the streaming device further includes one or more streaming support features, and one or more non-streaming applications.

In some embodiments of the method, the recommending of the set of software components for the streaming device further includes generating, using a first machine learning model, a software user preference indicator of a user associated with the streaming device; and generating, using a second machine learning model, the set of software components based on the software user preference indicator and information of the streaming device.

In some embodiments of the method, both the first machine learning model and the second machine learning model are deep learning models and are periodically retrained.

In some embodiments of the method, the generating of the software user preference indicator is based on one or more of: user interactions, user preference, device type, and historical behaviors of the user.

In some embodiments of the method, the information of the streaming device used to generate the set of recommended software components includes one or more of: device type, device specifications, and applications installed on the streaming device.

In some embodiments of the method, the closing of the at least one active software component includes disabling at least one support feature enabled on the streaming application or at least one non-streaming application.

According to other embodiments, the methods can be implemented by a system and/or a computer readable storage medium as described herein.

Managing streaming devices using machine learning offers several significant advantages that contribute to a more tailored user experience. By dynamically closing features and/or applications on streaming devices and optimizing the streaming devices based on device specifications and user preferences, this approach enhances device performance, user satisfaction, and overall efficiency.

As shown above and in more detail throughout the disclosure, various embodiments of the disclosure provide technical improvements over existing systems for managing streaming devices. These and other features and advantages of the disclosure will become more readily apparent in view of the embodiments described herein and illustrated in this specification.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments can be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments can be methods, systems, media, or devices. Accordingly, the various embodiments can be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "In some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
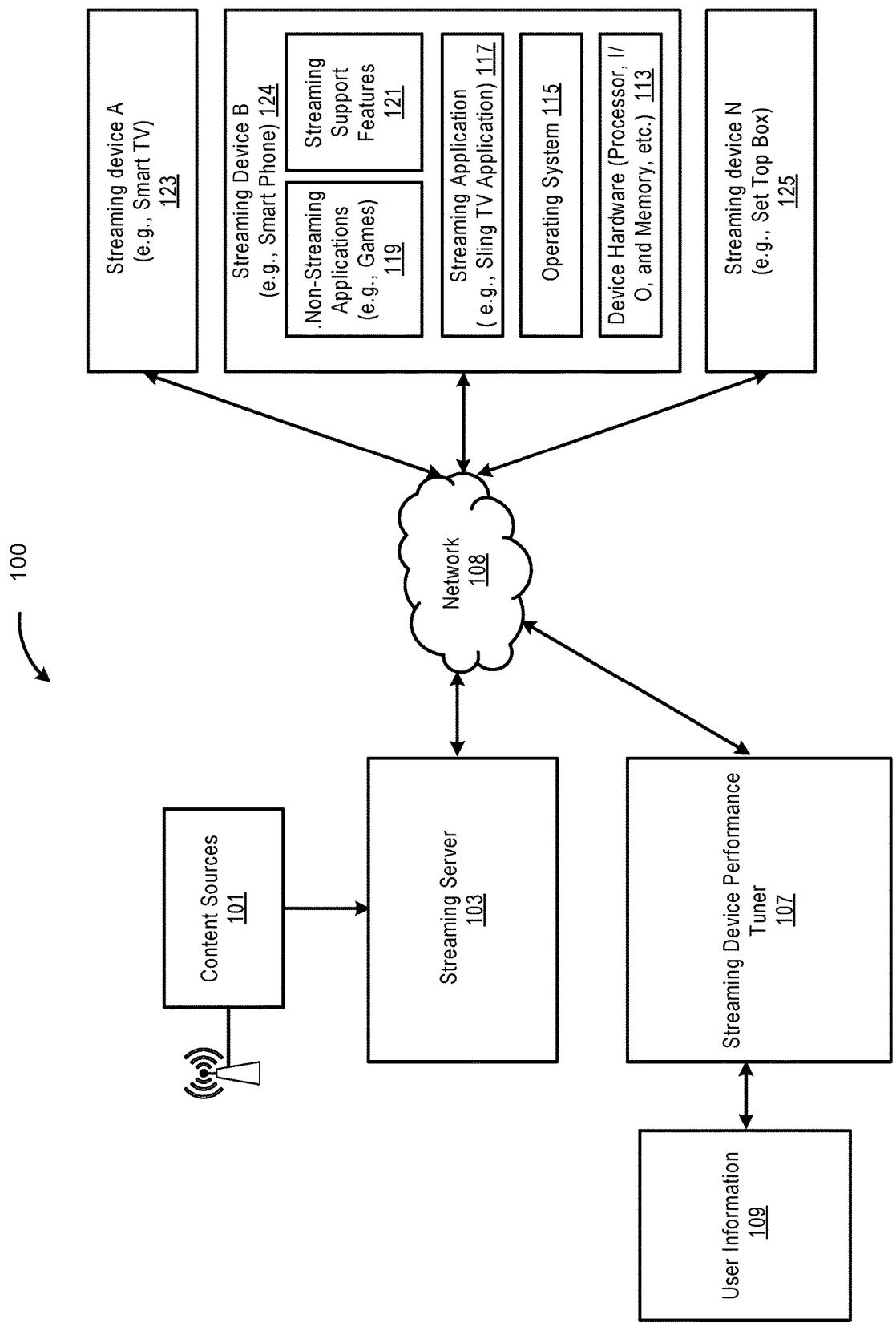
FIG. 1 is a block diagram illustrating an example of a media streaming system 100 in which embodiments of the disclosure are implemented.

FIG. 1 is a block diagram illustrating an example of a media streaming system 100 in which embodiment of the disclosure are implemented. The media streaming system 100 includes a streaming server 103 and a plurality of video streaming devices 123-125. The streaming server 103 receives media content from one or more content sources 101 and transmits that media content through the network 108 to the streaming devices 123-125 in the form of a data stream that can be received, processed, and presented to the user at the streaming devices 123-125.

The content sources 101 can be any type of media content source, including media providers, content aggregators or distributors such as a cable television system operator, a direct broadcast satellite (DBS) system operator, satellite radio operator, or simply a network service provider or the like. These content sources 101 can provide the media content to the streaming server 103 in any suitable form and by any suitable technique. For example, the media content can be provided via satellite, fiber optic or any other conventional wireless or physical media for transmitting signals. The transmitted signals can be received, demodulated and decoded as needed by any appropriate receiver(s) to extract program signals. The extracted programming signals can then be analyzed as appropriate to identify the program contents. A distributor/aggregator, for example, may encode the extracted signals for distribution on a digital network, for aggregation and redistribution of signals over a DBS or cable distribution system, for generating content stored on a remote storage digital video recorder (RSDVR) or video on demand (VOD) service, or for any other purpose.

This content can then be passed to the streaming server 103. Having received this content, the streaming server 103 can encode the received content into a suitable format for streaming to the streaming devices 123-125. For example, the streaming server 103 can transmit an encoded data stream via a content delivery network (CDN) for distribution on the network 108 (e.g., the Internet) as part of an RSDVR, VOD or other media streaming service. The media streams are thus transmitted to the streaming devices 123-125.

As some specific examples, each of the streaming devices 123-125 can be implemented with any suitable computing device, including laptops, tablets, virtual reality (VR) devices, and mobile communication devices (e.g., smart phones). Such devices may include an integrated display screen, may be coupled to a separate display screen, or may not include a display screen for audio only devices.

Each of the streaming devices 123-125 includes a combination of hardware and/or software needed to receive, process, and play the video streams received from the streaming server 103. For the simplicity of description, this figure only shows the hardware and software on the streaming device 124, which, for example, can be a smart phone device. The streaming device 124 can include device hardware 113, an operating system 115, a streaming application 117, one or more non-streaming applications 119, and streaming support features 121. Even though each of the streaming devices 123 and 125 may be of a distinct type compared to streaming device 124, their respective software stacks can be identical to that of streaming device 124 in terms of software application categories. That is to say, each of the streaming devices 123 and 125 can include an operating system, a streaming application with some streaming support features, and one or more non-streaming applications.

The operating system 115 can be any operating system compatible with the type of streaming service on which the operating system is installed. For example, the operating system 115 can be Android, iOS, or Samsung One UI if the streaming device 124 is a smart phone. The streaming application 117 can be any streaming applications, for example, Netflix, Hulu, YouTube TV, and Sling TV. Although the figure shows one streaming application on the streaming device 124, multiple streaming applications can be installed on each of the streaming devices 124-125. The streaming support features 121 can be software components providing support functions for the streaming application 117. For example, the streaming support features 121 can include a "Guide" feature and a "Watch on Demand" feature. These streaming support features 121 can be disabled without impacting the basic functions of the streaming application 117; they are provided to enhance users' streaming experiences.

For example, the "Guide" feature provides users with an interactive program guide (EPG-Electronic Program Guide) that displays a schedule of the available channels and their programming for an extended period of time, usually up to a week or more into the future. Users can browse through the guide to see what is currently airing, what is coming up, and plan their viewing schedule. It helps users find and select live TV channels and programs. As another example, the "Watch on Demand" feature allows users to access a library of on-demand content. This content includes a variety of movies, TV shows, and other video content that users can watch at their convenience. Instead of being tied to a specific broadcast schedule, users can select content from the On Demand library and watch it whenever they want. This feature adds flexibility to the viewing experience, allowing users to catch up on missed episodes or explore a wide range of content.

The non-streaming applications 119 can be any other applications on a streaming device, such as games, instant messaging applications, Fitness tracking applications, music applications, and travel applications.

As further shown, the media streaming system 100 can include a streaming device performance tuner 107, which can be a software module, software component, or a separate server. The streaming device performance tuner 107 is configured to enhance performance of the streaming devices 123-125 by actively managing software applications/features running on each streaming device to optimize their performance. In one embodiment, the streaming device performance tuner 107 can automatically disable certain streaming support features and/or close one or more non-streaming applications that are running on a streaming device when a streaming application is launched on the streaming device. The streaming device performance tuner 107 can determine which feature or application to disable or close using machine learning techniques based on attributes of a user associated with the streaming device and information of the streaming device. The activity of each user and the information of each streaming device can be retrieved from a user information storage 109, which can be any type of storage, such as a relational database and a NoSQL database.

Figure 2:
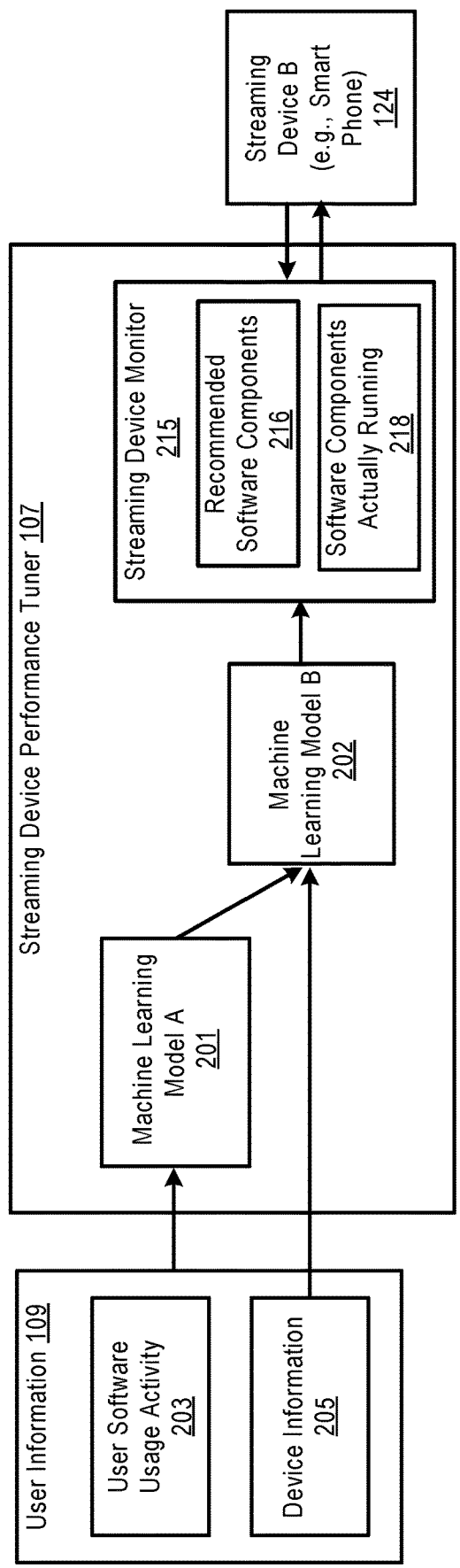
FIG. 2 is a block diagram further illustrating the streaming performance tuner 107 according to an embodiment of the disclosure.

FIG. 2 is a block diagram further illustrating the streaming performance tuner 107 according to an embodiment of the disclosure. More specifically, FIG. 2 illustrates how the streaming device performance tuner 107 determines which software components to close on a particular streaming device.

As shown, the streaming device performance tuner 107 includes machine learning model A 201, machine learning model B 202 and a streaming device monitor 215. In some examples, the streaming device monitor 215 can monitor the performance of the streaming device (e.g., the streaming device 124). The scope of monitoring of a streaming device depends on various factors, including the capabilities of the streaming device, the design of the software or application running on it, and the permissions granted by the user. In some embodiments, the streaming device monitor 215 has the capability to monitor network performance by tracking metrics like latency, packet loss, and bandwidth utilization. Additionally, it can monitor health metrics such as CPU usage, memory usage, and temperature. These metrics may be transmitted to the streaming device monitor 215 by certain types of streaming devices. In some embodiments, the streaming device monitor 215 can gather performance data pertaining to software applications running on a streaming device. This performance data includes metrics such as application startup times, responsiveness, and error reports. In some other embodiments, the streaming device monitor 215 can remotely manage resources on the device. This includes tasks such as allocating additional memory or CPU resources to a specific application or feature in order to optimize overall performance. Moreover, in some scenarios, device manufacturers and service providers can implement server-side monitoring features to enhance user experience, address technical issues, and ensure the seamless operation of their devices and services. In some embodiments, providers of streaming applications can provide updates to the streaming application and disable certain features without the user's explicit consent.

In one embodiment, machine learning model B 202 can be a convolutional neural network (CNN) trained to recommend a set of software components 216 that should run in additional to the streaming application such that the streaming device may have a desired performance in terms of predefined performance metrics in system resources usage (e.g., memory usage and/or CPU utilization). The set of recommended software components 216 can include one or more streaming support features of a streaming application or one or more non-streaming applications in addition to a streaming application. The set of recommended software components 216 can be generated by machine learning model B 202 based on device information 205 and software user preference indicators of users. The device information can include one or more of the type of the device type, the operating system of the device, the hardware specifications of the device, a list of applications installed on the device. The user preference indicators of users can be determined by machine learning A 201 from user software usage activity 203 in the past.

Machine learning model B 202 can send the set of recommended software components 216 that should run on the streaming device 124 to the streaming device monitor 215, which can keep track of software components 218 that are actually running on the streaming device. The streaming device monitor 215 can disable or close one or more of the software components 218 that are actually running but are not in the set of recommended software components 216.

Figure 3:
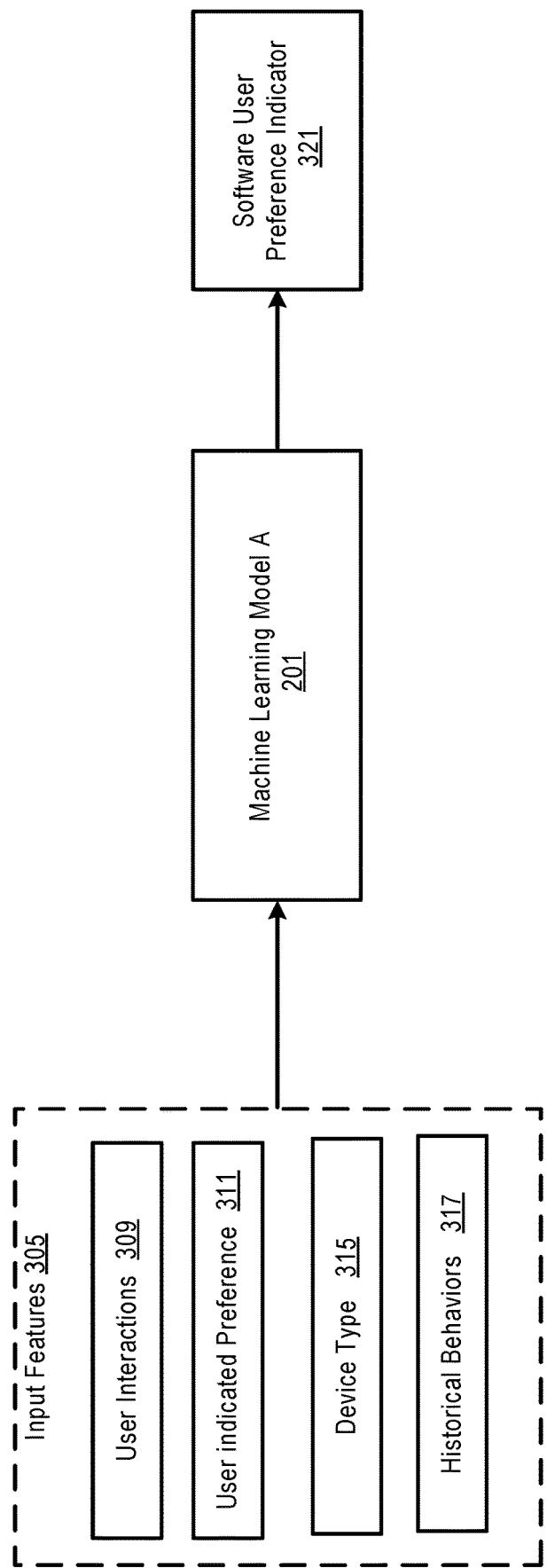
FIG. 3 is a block diagram further illustrating machine learning model A according to an embodiment of the disclosure.

FIG. 3 is a block diagram further illustrating machine learning model A 201 according to an embodiment of the disclosure. Machine learning A 201 can take input features that captures a user's historical activity and use the historical activity during a period of time in the past (e.g., the last 3 months) to determine the user's software user preference indicator 321. The software user preference indicator 321 can indicate the user's reference for a streaming application or other types of applications. This indicator can be one of the features that are used by machine learning model B 202 to recommend software components 216 on the user's streaming device.

For example, the user preference indicator 321 can be "streaming", which indicates that the user prefers to keep a streaming support feature, or "non-streaming", which indicates that the user prefers not to keep a non-streaming application. This indicator shows which type of applications the user prefers to keep on the streaming device when there is a resource contention on the streaming device and either a streaming support feature or a non-streaming application needs to be closed in order to meet one or more performance thresholds.

In one embodiment, this software user preference indicator 321 is relevant for machine learning model B 202 to determine which software component to recommend when there is a contention between a non-streaming application and a streaming support feature. For example, if the software user preference indicator 321 indicates that the user is more interested in gaming, then machine learning model B 202 would include a game program in the recommended software components 216 over a streaming support feature.

In one embodiment, the input features 305 can be preprocessed and encoded, and then concatenated into a single vector. As shown, the input features 305 include user interactions 309, user preference 311, device type 315, and historical behaviors 317. These input features are provided here merely for the purpose of illustrating that historical data related to the user are used to predict the software user preference indicator 321 for the user. Many other features can be used in actual implementations.

In one embodiment, the user interactions 309 represents how the user interacted with the streaming device. In the case of a smartphone, this feature can include daily frequencies of taps and swipes, and daily frequencies of passive scrolling in the past period. High frequencies of taps and swipes may indicate gaming, while high frequencies of passive scrolling might suggest video watching. The user preference 311 in a user's profile can be a strong indicator that the user for a particular type of application. For example, if the user indicates a preference for games, that could indicate that the user prefers games. The device type 315 can be indicative of the type of application the user would be more likely to use, because some devices are better suited for gaming, while others have better screens for video watching. The historical behavior 317 can reflect whether a user watched more videos or played more games in the past.

Figure 4:
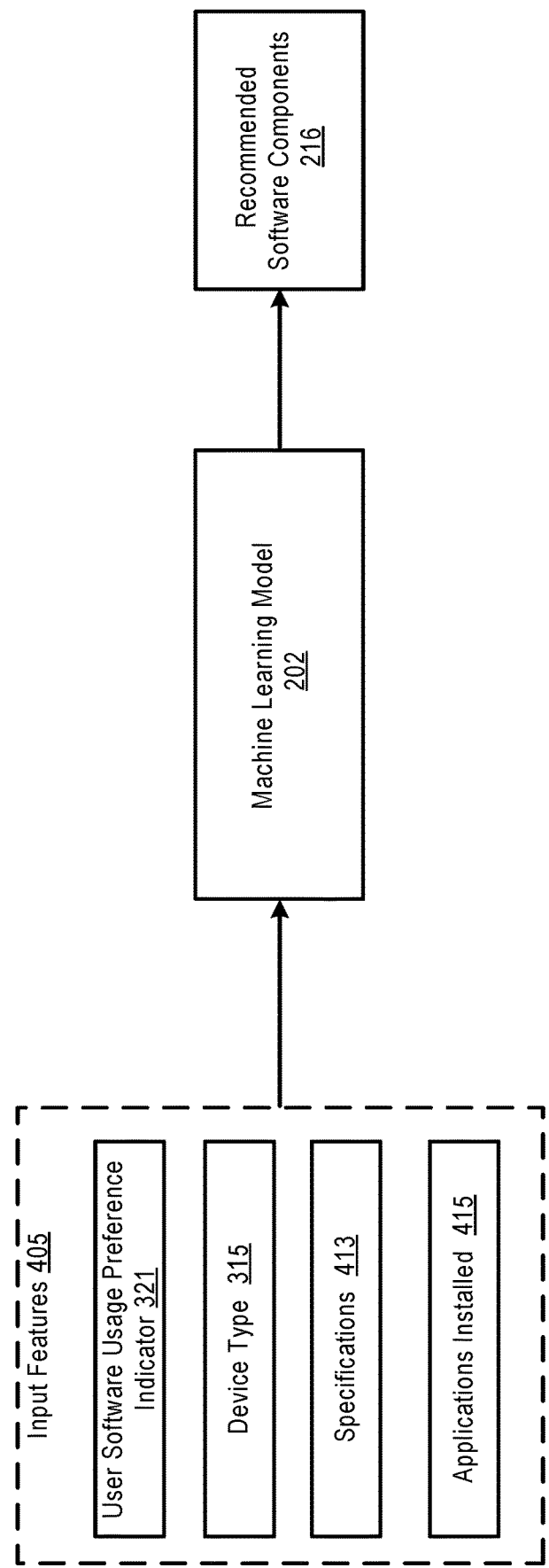
FIG. 4 is a block diagram further illustrating machine learning model B according to an embodiment of the disclosure.

FIG. 4 is a block diagram further illustrating machine learning model B 202 according to an embodiment of the disclosure. Machine learning model B 202 is trained to recommend software components 216 that should run for performance optimization on a streaming device of a user based on input features 405, which include software user preference indicator 321, device type 315, device specifications 413, and applications 415 installed on the device. The software user preference indicator 321 is the output of machine learning model A 201. The device type 315 is the same feature used for machine learning model A 201. The device specifications 413 indicates the specifications of the user's streaming device, such as the amount of CPU, memory, and storage available. This feature represents the hardware constraints of the streaming device for determining software components that are most appropriate for the user's steaming device. The applications 415 installed on the device are the applications that are installed on the user's streaming device and this information is relevant for recommending software components that should run because of software component dependency.

Machine learning model B 202 can be trained on a dataset of historical data collected from a large number of streaming devices of different types.

Figure 5:
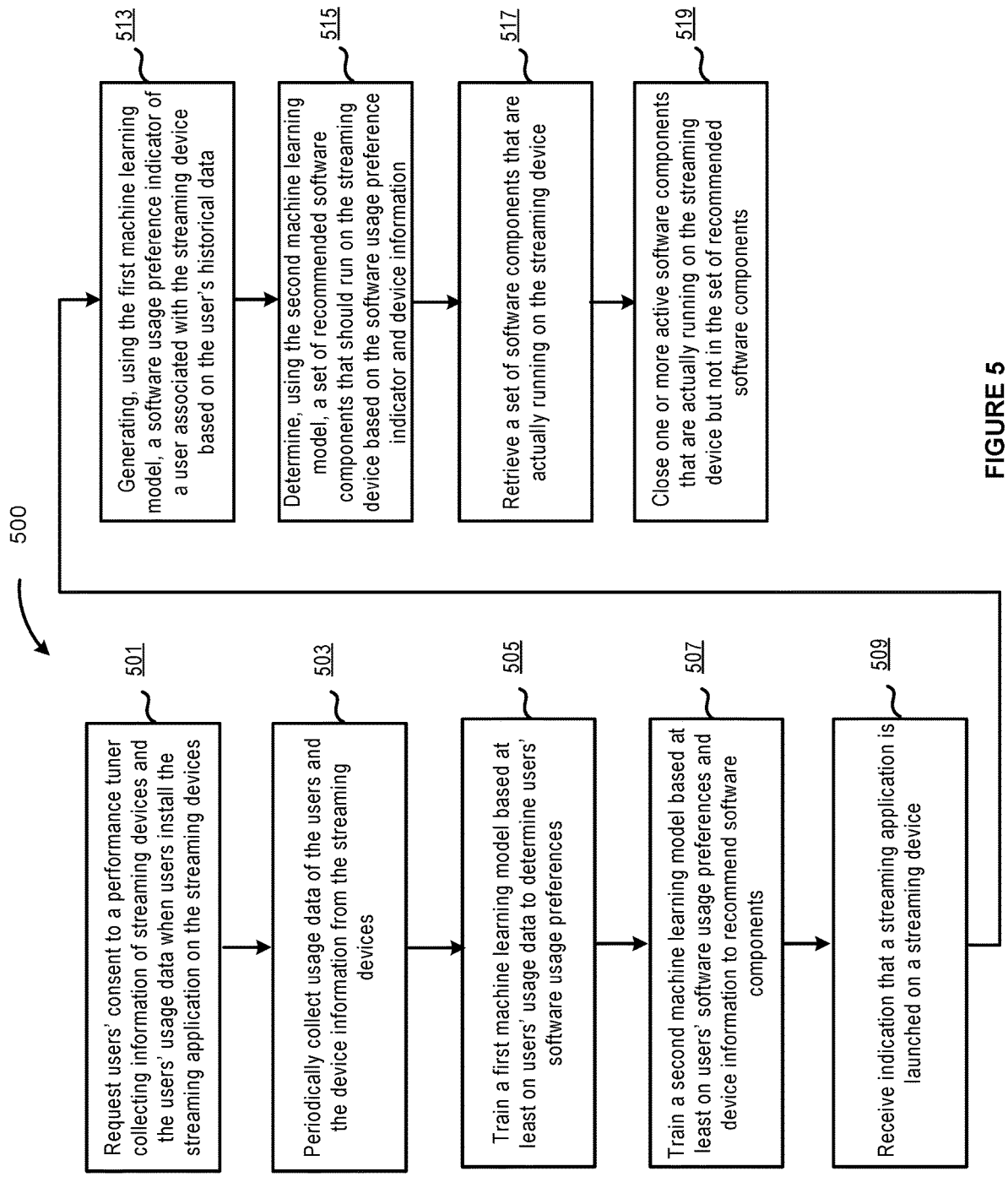
FIG. 5 is a block diagram illustrating a process of managing a streaming device according to an embodiment of the disclosure.

FIG. 5 is a block diagram illustrating a process 500 of managing a streaming device according to an embodiment of the disclosure. The process 500 can be performed by a processing logic that include software, hardware, or a combination thereof. For example, the process 500 can be performed by the streaming device performance tuner 107 described in FIG. 1 and FIG. 2.

At step 501, the processing logic requests users' consent to a performance tuner collecting information of streaming devices and the users' usage data when users install the streaming application on the streaming devices.

At step 503, the processing logic periodically collects usage data of the users and the device information from the streaming devices.

At step 505, the processing logic trains a first machine learning model based at least on users' usage data to determine users' software user preferences, and subsequently periodically retrain the machine learning model, which can be a deep learning model, such as an CNN. For example, the retraining can occur weekly or monthly.

At step 507, the processing logic trains a second machine learning model based at least on users' software user preferences and device information to recommend software components, and subsequently periodically retrain the machine learning model, which can be a deep learning model, such as an CNN.

At step 509, the processing logic receives indication that a streaming application is launched on a streaming device. The indication can be received by a side-side streaming device monitor that is constantly monitoring streaming devices of all users of a streaming device service.

At step 513, the processing logic generates, using the first machine learning model, a software user preference indicator of a user associated with the streaming device based on the user's historical data. The software user preference indicator indicates the user's preference for using the streaming application and its related support features or an application that is not related to streaming.

At step 515, the processing logic determines, using the second machine learning model, a set of recommended software components that should run on the streaming device based on the software user preference indicator and device information. Since this recommended set of software components are drawn on streaming devices of a large number of users over a long period of time, the set of recommended software components would represent a combination of software components, if running on the streaming device, would not consume memory and/or CPU cycles that renders the performance of the streaming device unsatisfactory in terms of one or more predetermined metrics.

At step 517, the processing logic retrieves a set of software components that are actually running on the streaming device. The streaming device monitor can retrieve the information from each streaming device that is constantly monitored.

At step 519, the processing logic closes one or more software components that are actually running on the streaming device but not in the set of recommended software components. The closing includes disabling one or more streaming support features and/or terminating one or non-streaming applications to release occupied memory or reduce CPU utilization.

Figure 6:
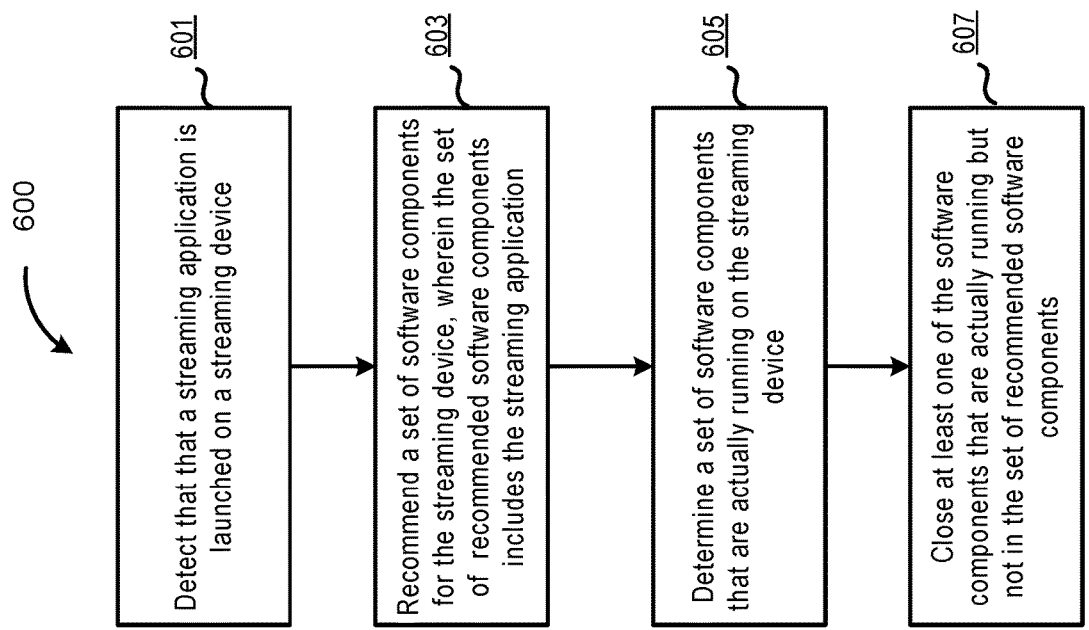
FIG. 6 is a block diagram illustrating another process of managing a streaming device according to an embodiment of the disclosure.

FIG. 6 is a block diagram illustrating a process 600 of managing a streaming device according to an embodiment of the disclosure. The process 600 can be performed by a processing logic that include software, hardware, or a combination thereof. For example, the process 600 can be performed by the streaming device performance tuner 107 described in FIG. 1 and FIG. 2.

At step 601, the processing logic detects that a streaming application is launched on the streaming device.

At step 603, the processing logic recommends a set of software components for the streaming device, wherein the set of recommended software components includes the streaming application.

At step 605, the processing logic determines a set of software components that are actually running on the streaming device.

At step 607, the processing logic closes at least one of the software components that are actually running but not in the set of recommended software components.

Figure 7:
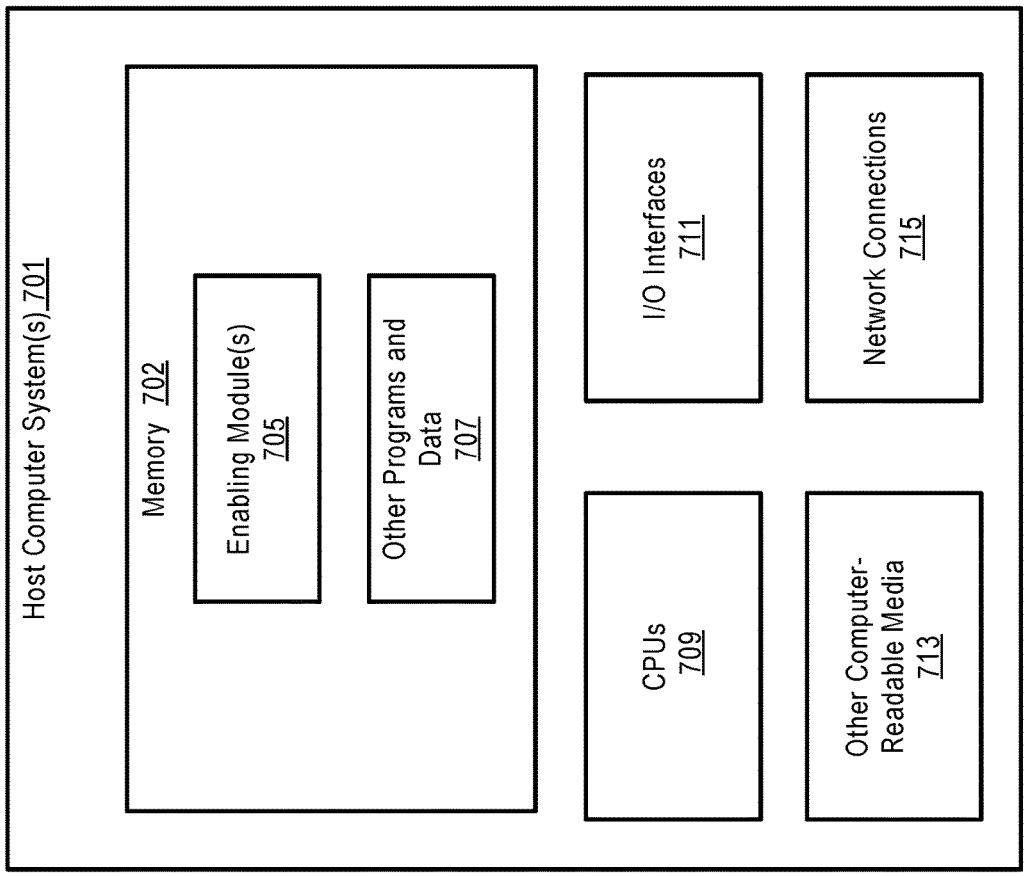
FIG. 7 shows a system diagram that describes an example implementation of a computing system(s) for implementing embodiments described herein.

FIG. 7 shows a system diagram that describes an example implementation of a computing system(s) for implementing embodiments described herein.

The functionality described herein for testing MMS messaging capacity of a wireless network can be implemented either on dedicated hardware, as a software instance running on dedicated hardware, or as a virtualized function instantiated on an appropriate platform, e.g., a cloud infrastructure. In some embodiments, such functionality can be completely software-based and is designed as cloud-native, meaning that they are agnostic to the underlying cloud infrastructure, allowing higher deployment agility and flexibility. However, FIG. 7 illustrates an example of underlying hardware on which such software and functionality can be hosted and/or implemented.

In this embodiment, an example host computer system(s) 701 is used to represent one or more of those in various components shown and/or described herein that are, or that host or implement the functions of: streaming devices, components, microservices, machine learning models, intelligence layers, orchestrators and/or other aspects described herein, as applicable, for machine learning based performance tuning of streaming devices. In some embodiments, one or more special-purpose computing systems can be used to implement the functionality described herein. Accordingly, various embodiments described herein can be implemented in software, hardware, firmware, or in some combination thereof. Host computer system(s) 701 can include memory 702, one or more central processing units (CPUs) 709, I/O interfaces 711, other computer-readable media 713, and network connections 715.

Memory 702 can include one or more various types of non-volatile (non-transitory) and/or volatile (transitory) storage technologies. Examples of memory 702 can include, but are not limited to, flash memory, hard disk drives, optical drives, solid-state drives, various types of random-access memory (RAM), various types of read-only memory (ROM), neural networks, other computer-readable storage media (also referred to as processor-readable storage media), or the like, or any combination thereof. Memory 702 can be utilized to store information, including computer-readable instructions that are utilized by CPU 709 to perform actions, including those of embodiments described herein.

Memory 702 can have stored thereon enabling module(s) 705 that can be configured to implement and/or perform some or all of the functions of the systems, components and modules described herein. Memory 702 can also store other programs and data 707, which can include rules, databases, application programming interfaces (APIs), software containers, nodes, pods, clusters, node groups, control planes, software defined data centers (SDDCs), microservices, virtualized environments, software platforms, cloud computing service software, network management software), artificial intelligence (AI) or machine learning (ML) programs or models to perform the functionality described herein, user interfaces, operating systems, etc.

Network connections 715 are configured to communicate with other computing devices to facilitate the functionality described herein. In various embodiments, the network connections 715 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 711 can include video interfaces, other data input or output interfaces, or the like. Other computer-readable media 713 can include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims but should be construed to include all possible embodiments along with the full scope of equivalents to which such claims are entitled. Accordingly, the claims are not limited by the disclosure.

The invention claimed is:

1. A method of managing streaming devices, comprising:
   detecting that a streaming application is launched on a streaming device;
   recommending, in response to detecting that the streaming application is launched on the streaming device, a first set of software components that should run together on the streaming device due to software component dependency, the set of recommended software components comprising the streaming application;
   determining a second set of software components that are actually running on the streaming device;
   determining that a specific software component is not included in the first set of software components that should run together on the streaming device due to software component dependency but is included in the second set of software components that are actually running on the streaming device; and
   closing, in response to determining that the specific software component is not included in the first set of software components that should run together on the streaming device due to software component dependency but is included in the second set of software components that are actually running on the streaming device, the specific software component.

2. The method of claim 1, wherein the first set of set of software components that should run together on the streaming device due to software component dependency further includes one or more streaming support feature and one or more non-streaming applications.

3. The method of claim 2, wherein the recommending of the first set of set of software components that should run together on the streaming device due to software component dependency further comprises:
   generating, using a first machine learning model, a software user preference indicator of a user associated with the streaming device; and
   generating, using a second machine learning model, the first set of software components that should run together on the streaming device due to software component dependency based on the software user preference indicator and information of the streaming device.

4. The method of claim 3, wherein both the first machine learning model and the second machine learning model are deep learning models.

5. The method of claim 4, wherein the generating of the software user preference indicator is based on one or more of: user interactions, user preference, device type, or historical behaviors of the user.

6. The method of claim 4, wherein the information of the streaming device used to generate the first set of software components that should run together on the streaming device due to software component dependency includes one or more of: device type, device specifications, or applications installed on the streaming device.

7. The method of claim 1, wherein the streaming device comprises one of a smart phone, a set top box, or a smart TV.

8. The method of claim 1, wherein the closing of the specific software component that is actually running includes disabling at least one feature enabled on the streaming application or exiting at least one non-streaming application.

9. A system for managing streaming devices, comprising:
   one or more processors; and
   one or more memories that are coupled to the one or more processors and storing program instructions for managing streaming devices, which, when executed by the one or more processors, cause the system to perform operations comprising:
     detecting that a streaming application is launched on a streaming device; recommending, in response to detecting that the streaming application is launched on the streaming device, a first set of software components that should run together on the streaming device due to software component dependency, the set of recommended software components comprising the streaming application;

determining a second set of software components that are actually running on the streaming device;

determining that a specific software component is not included in the first set of software components that should run together on the streaming device due to software component dependency but is included in the second set of software components that are actually running on the streaming device; and closing, in response to determining that the specific software component is not included in the first set of software components that should run together on the streaming device due to software component dependency but is included in the second set of software components that are actually running on the streaming device, the specific software component.

10. The system of claim 9, wherein the first set of set of software components that should run together on the streaming device due to software component dependency further includes one or more streaming support feature and one or more non-streaming applications.

11. The system of claim 10, wherein
the recommending of the first set of set of software components that should run together on the streaming device due to software component dependency further comprises:
generating, using a first machine learning model, a software user preference indicator of a user associated with the streaming device; and
generating, using a second machine learning model, the first set of software components that should run together on the streaming device due to software component dependency based on the software user preference indicator and information of the streaming device.

12. The system of claim 11, wherein both the first machine learning model and the second machine learning model are deep learning models.

13. The system of claim 12, wherein the generating of the software user preference indicator is based on one or more of: user interactions, user preference, device type, or historical behaviors of the user.

14. The system of claim 12, wherein the information of the streaming device used to generate the first set of software components that should run together on the streaming device due to software component dependency includes one or more of: device type, device specifications, or applications installed on the streaming device.

15. The system of claim 9, wherein the streaming device comprises one of a smart phone, a set top box, or a smart TV.

16. The system of claim 9, wherein the closing of the specific software component that is actually running includes disabling at least one feature enabled on the streaming application or exiting at least one non-streaming application.

17. A non-transitory computer readable storage medium storing program instructions for managing streaming device, wherein the program instructions, when executed by one or more processors, cause the one or more processors to perform operations comprising:

detecting that a streaming application is launched on a streaming device;

recommending, in response to detecting that the streaming application is launched on the streaming device, a first set of software components that should run together on the streaming device due to software component dependency, the set of recommended software components comprising the streaming application;

determining a second set of software components that are actually running on the streaming device;

determining that a specific software component is not included in the first set of software components that should run together on the streaming device due to software component dependency but is included in the second set of software components that are actually running on the streaming device; and closing, in response to determining that the specific software component is not included in the first set of software components that should run together on the streaming device due to software component dependency but is included in the second set of software components that are actually running on the streaming device, the specific software component.

18. The non-transitory computer readable storage medium of claim 17, wherein the first set of set of software components that should run together on the streaming device due to software component dependency further includes one or more streaming support feature and one or more non-streaming applications.

19. The non-transitory computer readable storage medium of claim 17,
wherein the recommending of the first set of set of software components that should run together on the streaming device due to software component dependency further comprises:
generating, using a first machine learning model, a software user preference indicator of a user associated with the streaming device; and
generating, using a second machine learning model, the first set of software components that should run together on the streaming device due to software component dependency based on the software user preference indicator and information of the streaming device.

20. The non-transitory computer readable storage medium of claim 18, wherein the recommending of the first set of set of software components that should run together on the streaming device due to software component dependency further comprises:
generating, using a first machine learning model, a software user preference indicator of a user associated with the streaming device; and
generating, using a second machine learning model, the first set of software components that should run together on the streaming device due to software component dependency based on the software user preference indicator and information of the streaming device.

* * * * *